No. 608,241. Patented Aug. 2, 1898.
H. WILBURN.
BICYCLE GEAR.
(Application filed July 12, 1897.)

(No Model.) 2 Sheets—Sheet 1.

Witnesses
Saml R Turner
Gladys L. Thompson.

Inventor
Hugh Wilburn.
By R.S.A.O. Lacey,
his Attorney

No. 608,241. Patented Aug. 2, 1898.
H. WILBURN.
BICYCLE GEAR.
(Application filed July 12, 1897.)
(No Model.) 2 Sheets—Sheet 2.

Witnesses
Saml R Turner
Gladys L. Thompson.

Inventor
Hugh Wilburn.
By R. W. A. & Lacey,
his Attorneys.

UNITED STATES PATENT OFFICE.

HUGH WILBURN, OF RITZVILLE, WASHINGTON.

BICYCLE-GEAR.

SPECIFICATION forming part of Letters Patent No. 608,241, dated August 2, 1898.

Application filed July 12, 1897. Serial No. 644,364. (No model.)

*To all whom it may concern:*

Be it known that I, HUGH WILBURN, a citizen of the United States, residing at Ritzville, in the county of Adams and State of Washington, have invented a new and useful Bicycle Power-Gear, of which the following is a specification.

My invention relates to improvements in that class of bicycle power-gearing in which a rack actuated by pedals or levers meshes with a pinion fixed on the shaft of the rear wheel and drives said wheel.

The object of this invention is to provide a simple and effective gearing of this class consisting of a rack adapted to both reciprocate and rotate on the pinion and improved mechanism for imparting motion thereto.

The detailed objects and advantages of the invention will appear in the course of the subjoined description.

Figure 1:
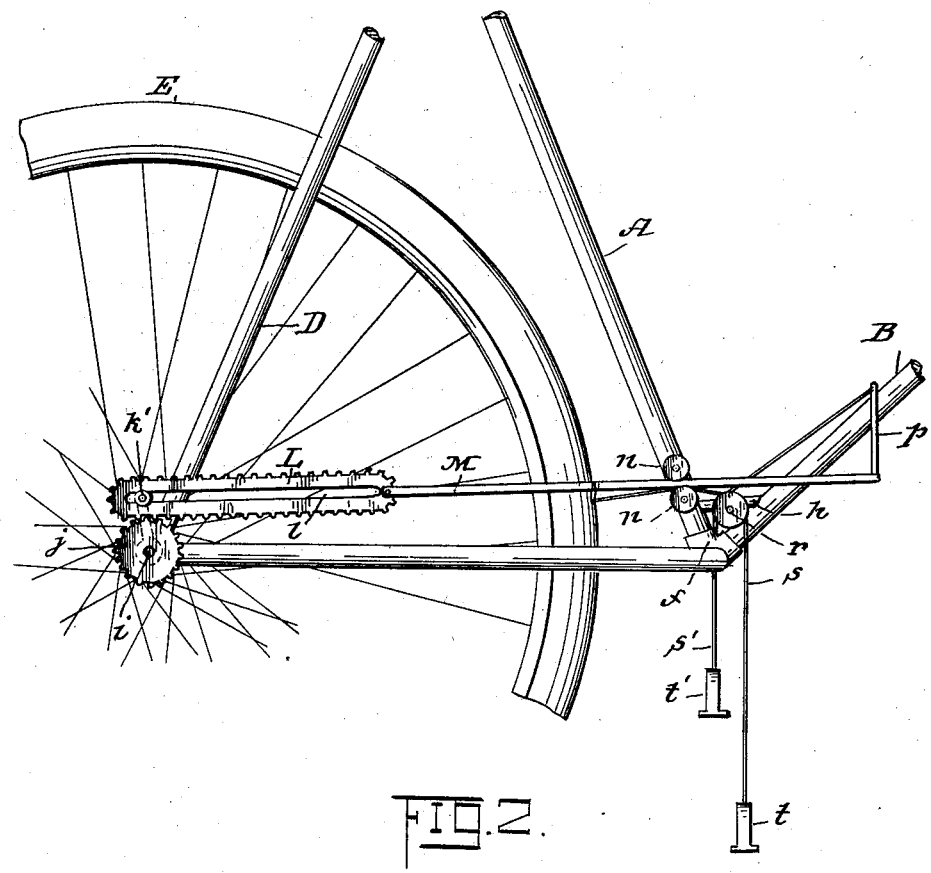
Figure 2:
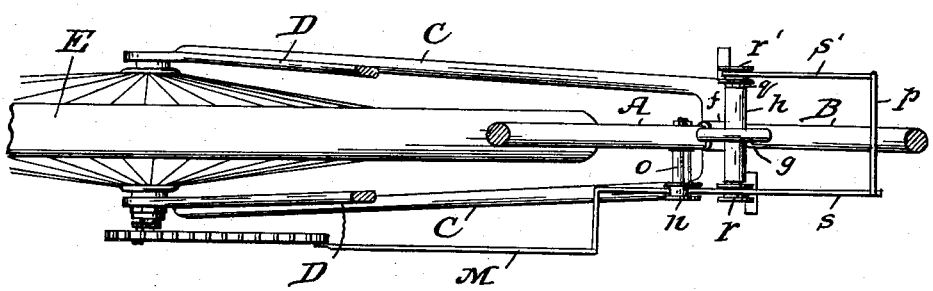
Figure 3:
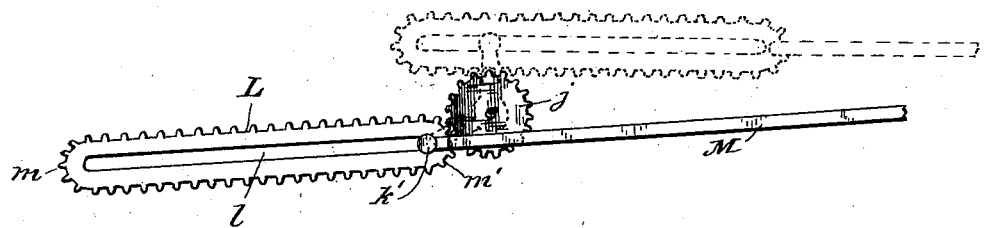
Figure 4:
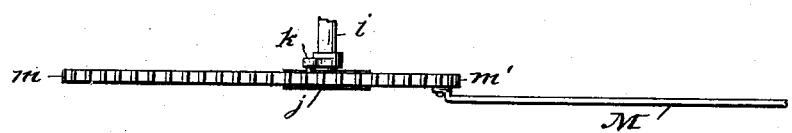
Figure 5:
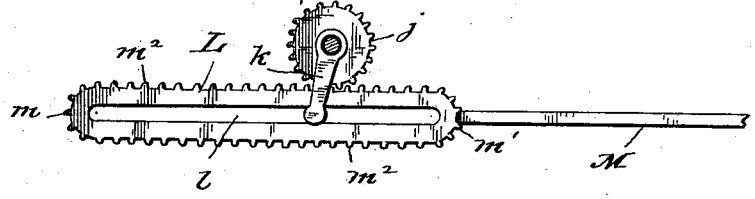
Figure 6:
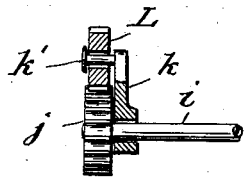

In the accompanying drawings, Figure 1 is a side elevation of a portion of the frame and drive-wheel of a bicycle, showing my invention applied thereto. Fig. 2 is a top plan view of same. Fig. 3 is an outer side view of the pinion, rack, and the connecting-rod, showing in full and dotted lines the movements of the rack. Fig. 4 is a top plan view showing the rack making its forward traverse. Fig. 5 is an inner side view showing the crank-arm and the rack making its backward traverse, and Fig. 6 is a cross-section of the parts as shown in Fig. 4.

Referring now more particularly to the said drawings, A B represent the two diagonal down-tubes, C the rear-fork tubes, and D the rear-fork legs, of a bicycle-frame, and E the rear or drive wheel mounted therein. In accordance with my invention I dispense with the ordinary crank-hanger and substitute in lieu thereof a socket-piece $f$, to which said down-tubes and rear-fork legs are united by brazing or in any other suitable manner. Adjacent to said socket-piece the diagonal down-tubes are reinforced by a brace-piece $g$, and extending transversely thereof is a fixed hub or tubular bearing $h$, the function of which will be described hereinafter.

The rear wheel is rigidly mounted on an axle $i$, having one end projecting laterally of the frame and carrying a pinion $j$ and a crank-arm $k$, the wrist-pin $k'$ of which is fitted in the longitudinal slot $l$ of a rack L, meshing with said pinion. This rack has its opposite ends $m$ $m'$ rounded and is formed with a continuous series of teeth $m^2$, extending around its upper and lower faces and rounded ends, as shown. The rack is guided in its movements by the crank-arm and has both reciprocatory and rotary motion on the pinion, to which it imparts motion. When the rack is making its forward reciprocation or traverse, its lower face meshes with the pinion, and this continues until its rear end $m$ is carried around the pinion. The upper face of the rack then meshes with the pinion, and the rack begins its rearward traverse until its front end $m'$ is carried around by the crank-arm, and the forward traverse again commences.

Connected with the front end of the rack is a rod M, which is bent inward about midway of its length and thence extended forward and passed between grooved guide-pulleys $n$, mounted on shafts $o$, fixed to one of the diagonal down-tubes A. At its forward end the rod carries a curved arm $p$, which projects across the tube B to the opposite side of the frame.

The mechanism for operating the rack comprises a shaft $q$, having bearing in the hub $h$ and carrying at its opposite ends grooved pulleys $r$ $r'$. Attached to the rod M is a strap or band $s$, of leather or spring-steel, and the free end of this strap passes between the pulleys $n$ and over the pulley $r$ and carries a stirrup $t$. Connected with the arm $p$ at the opposite side of the frame is a similar strap or band $s'$, which passes over the pulley $r'$ and carries a stirrup $t'$. These stirrups are alternately depressed by the feet of the rider. The depression of the stirrup $t$ reciprocates the rack forward and at the same time imparts a half-revolution to the same, while the depression of the stirrup $t'$ reciprocates the rack in the reverse direction and completes the revolution. By this construction and mode of operation it will be seen that a continuous rotary motion will be imparted to the pinion and drive-wheel in a forward direction.

I desire it understood that I do not limit my invention to the specific construction and arrangement of parts shown and described, as it is obvious that changes in the form, proportions, and minor details of construction of the parts may be made within the scope of the invention without departing from the spirit thereof.

Having thus fully described my invention, what I claim as new and useful, and desire to secure by Letters Patent, is—

In gearing for bicycles, the combination with the frame and drive-wheel, of guide-pulleys on one of the diagonal down-tubes of said frame, a cross-shaft carrying pulleys, a pinion on the axle of the rear wheel, a rack meshing with said pinion and having a longitudinal slot, a crank-arm on the axle provided with a wrist-pin fitted in said slot, a rod attached to the rack and fitted to move in said guide-pulleys and provided with a lateral arm projecting over to the opposite side of the frame, a strap connected with the rod and passed over one of the pulleys on the cross-shaft and carrying a stirrup, and a second strap connected with the lateral arm, passed over the other pulley on the cross-shaft and also carrying a stirrup, substantially as described.

HUGH WILBURN.

Witnesses:
EVA HOLCOMB,
WALTER STASER.